No. 680,729. Patented Aug. 20, 1901.
F. NISHWITZ, Dec'd.
C. R. B. NISHWITZ, Administratrix.
HARROW.
(Application filed Nov. 16, 1900.)
(No Model.) 3 Sheets—Sheet 3.
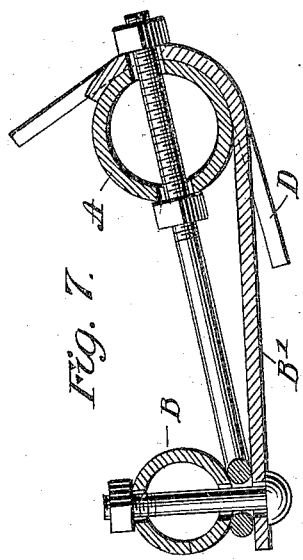
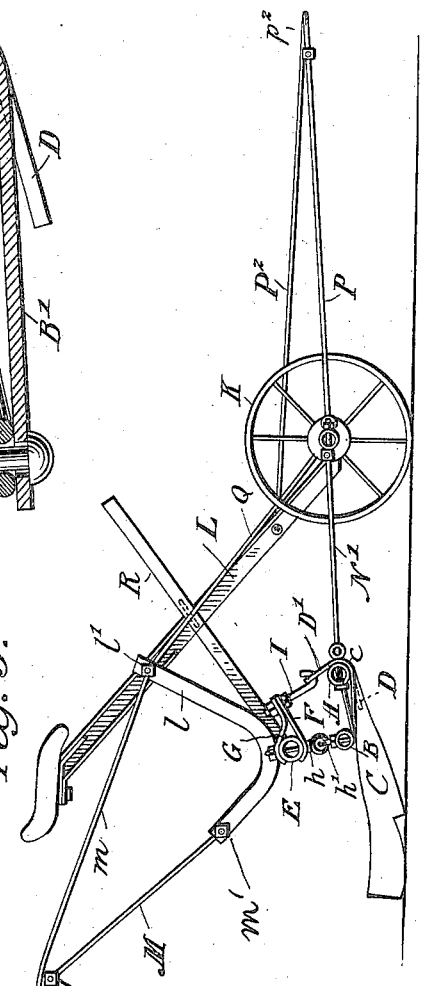
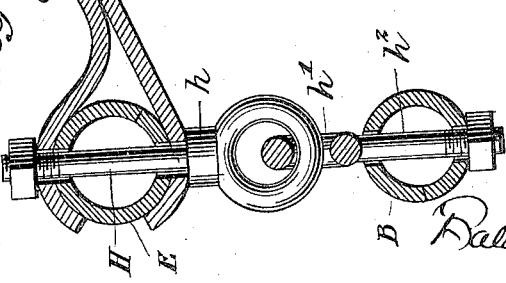
WITNESSES:
INVENTOR
ATTORNEYS

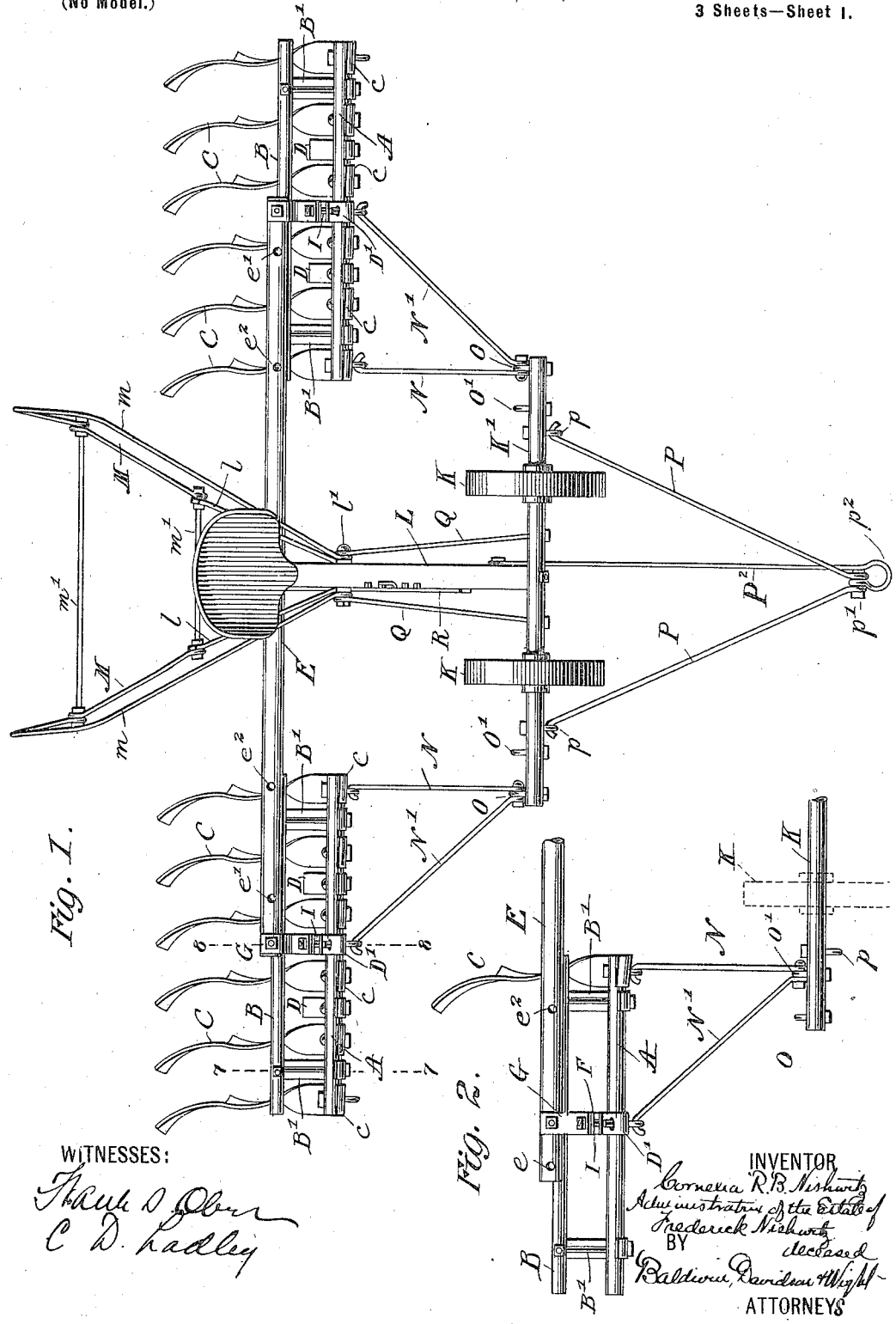

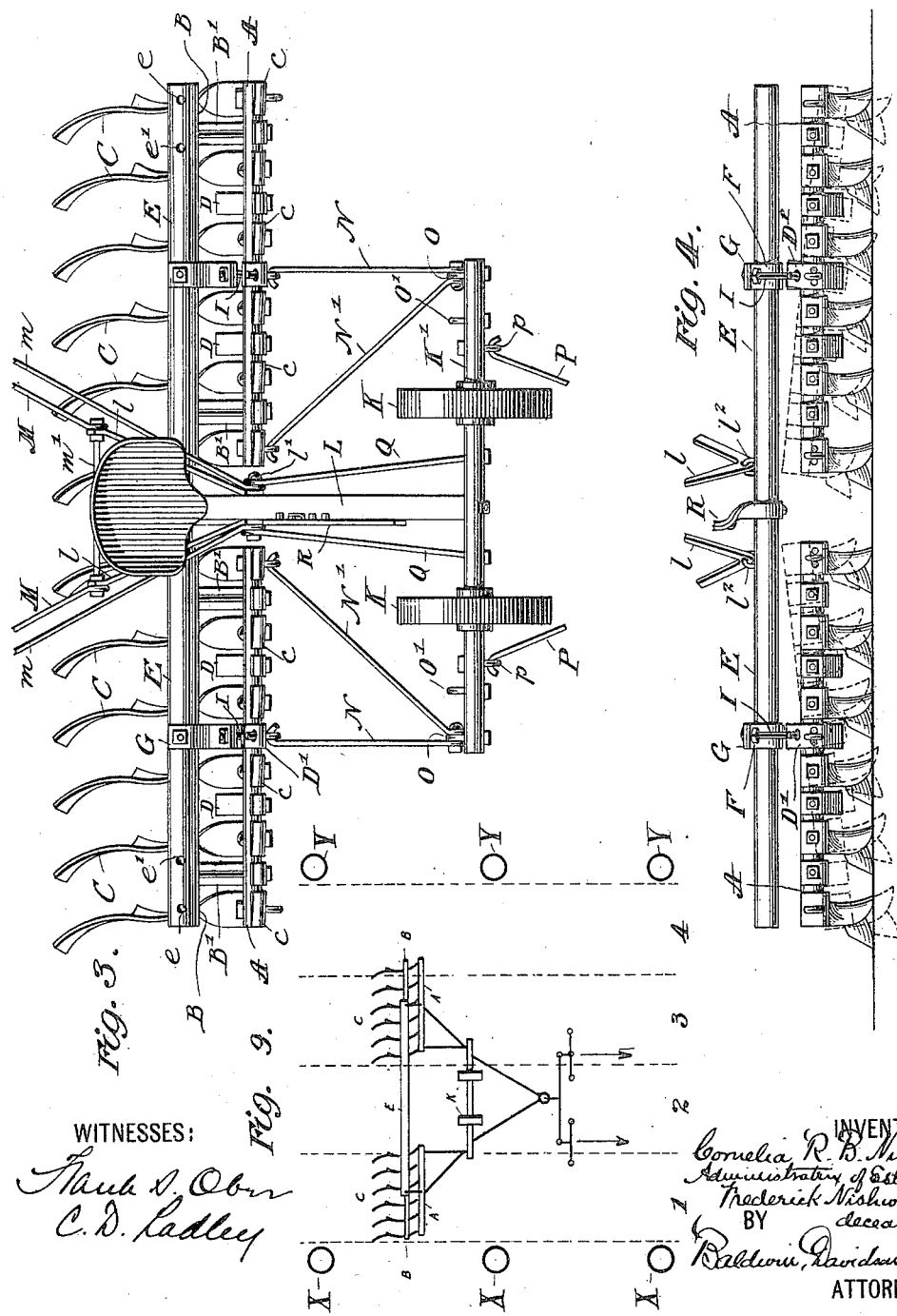

UNITED STATES PATENT OFFICE.

CORNELIA R. B. NISHWITZ, OF MILLINGTON, NEW JERSEY, ADMINISTRATRIX OF FREDERICK NISHWITZ, DECEASED.

HARROW.

SPECIFICATION forming part of Letters Patent No. 680,729, dated August 20, 1901.

Application filed November 16, 1900. Serial No. 36,765. (No model.)

*To all whom it may concern:*

Be it known that FREDERICK NISHWITZ, deceased, late of Millington, county of Morris, State of New Jersey, and of whose estate I, CORNELIA R. B. NISHWITZ, of Millington aforesaid, am sole administratrix, invented certain new and useful Improvements in Harrows, of which the following is a specification.

This invention comprises what may be called an "orchard-harrow," in which while the whole width of the space between the rows of trees may be acted upon by the harrow-teeth in two or more traverses of the length of the space the team is kept in the middle portion of the space and the machine may readily be handled and turned. With this general object in view the machine is provided with two gangs of harrow-teeth, the length of each gang being equal to or about one-fourth the width of the space between the trees and the space between the inner ends of the two gangs being the same or about the same as the length of a gang. With these or substantially these proportions it will be seen that the team is kept away from the trees and that the first and third quarters of the space between the trees will be harrowed in one traverse of the machine and the second and fourth quarters in the next traverse. The machine, however, is so constructed that the two gangs of teeth may be set with their inner ends close together, when it may be used, as is an ordinary harrow, for harrowing a continuous width of soil and is also in condition for more convenient transportation to and from the fields in which it is to be used. Aside from this general organization of the machine the invention comprises features of construction hereinafter described in detail and claimed. As herein shown, the machine is equipped with trailing harrow-teeth and clod-crushers, the same as those employed in the well-known Nishwitz "Acme" harrow; but other styles of harrow-teeth may be used and clod-crushers either of the kind shown or of other styles may or may not be used. The machine also has independent gang-bars arranged in line on opposite sides of the central draft-line with rear tooth-bracing bars rigidly attached, a rocking bar arranged above the gang-bars, and hinge connections between it and the gang-bars, upon which the latter bars flex or rock transversely to the draft-line. A harrow of this construction for harrowing a continuous width of soil is shown and claimed in an application filed by Frederick Nishwitz November 16, 1900, Serial No. 36,764, and such features are therefore not broadly claimed herein.

In the accompanying drawings, Figure 1 is a plan view of the harrow organized for orchard use; Fig. 2, a detail plan view of one side or end of Fig. 1, showing one gang of teeth connected to the main or rocking bar at a different point; Fig. 3, a like view with the inner ends of the two gangs close together; Fig. 4, a front view of the machine as shown in Fig. 3, but with the seat-standard and draft devices removed; Fig. 5, a side elevation; Fig. 6, a detail perspective view showing the rocking bar with one gang of teeth hinged to one end of it; Fig. 7, an enlarged detail section, omitting the harrow-teeth, on the line 7 7 of Fig. 1; Fig. 8, an enlarged detail section, omitting the harrow-teeth, on the line 8 8 of Fig. 1. Fig. 9 is a diagram.

The main gang-bars A A are arranged in line on each side of the central draft-line. To each such bar is rigidly attached a bar B in rear and parallel with it, the connections between them being made by plates B' and suitable bolts, as shown in detail in Fig. 7, or otherwise. Rearwardly-projecting trailing harrow-teeth C, of the usual "Acme" type, have front-curved ends c, that embrace the gang-bars and are secured thereto by suitable bolts. The bars B lie in contact with the upper edges of the vertical parts of the teeth and brace and hold them down to their work, while at the same time they are held in line and caused to penetrate the soil equally. Between the teeth are arranged rearwardly-extending spurs or clod-crushers D, consisting of flat metal plates curved at their front ends to embrace the bars A and attached by bolts and shown as lying in the same plane as the front flat portions of the teeth. When the harrow is in action, the spurs act as clod-crushers, and when the teeth are thrown up out of contact with the soil their front flat portions and the spurs D serve as runners on which the machine may be transported. In a plane above and preferably in rear of the bars A is the main frame or rocking bar E, disposed equally on opposite sides of the center draft-line. Near each end of this bar are three apertures $e$ $e'$ $e^2$ for the attachment of a hinge connection between the bar and the respective bars A B of the two gangs. This connection is shown in detail in Figs. 5 and 8. This hinge connection is shown as composed of two plates F G, each curved at one end to embrace the upper and lower faces, respectively, of the bar E and there apertured to receive the bolt H, which passes through them and the aperture $e$, $e'$, or $e^2$ in the bar. The lower end of the bolt is formed with an eye and with a boss $h$, that bears against the under face of the plate F. The eye is interconnected with the eye $h'$ on the upper end of a bolt $h^2$, passing through the bar B. The plates F G extend forward from bar E into contact and are there apertured to receive the upper end of a rod I, which inclines forwardly and downwardly and has a hooked end that engages the upwardly-extending end D' of the centrally-disposed spur or clod-crushing plate D. It is apparent that the plates F G may be connected with the bar E at either $e$, $e'$, or $e^2$, and therefore that the distance between the inner ends of the gang of cutters may be varied. It is also apparent that each gang may rock transversely to the line of draft upon its hinge connection with the bar E. Two guiding-wheels K K at the front of the machine are mounted upon a shaft or axle K', with which the draft devices hereinafter described are connected. The seat-standard L is attached to this axle centrally between the wheels K K and inclines rearwardly and upwardly, being pivotally supported at or near its upper end by legs or rods $l$, connected to the seat-standard by a bolt $l'$ and with the bar E by means of hooks $l^2$, Fig. 6, on the bar, which engage apertures in the legs $l$. In the rear of the point of connection with the bar E the legs extend upwardly and rearwardly and have attached to them upwardly and rearwardly extending rods M, which, with other rods $m$ and cross rods or braces $m'$ $m'$, form handles to be used by the operator, if desired, when the machine is being turned or while being transported to and from work, the upper rods $m$ of the series being brought forward and connected to the seat-standard by the bolt $l'$.

Referring now particularly to Fig. 1, it will be observed that each gang of cutters is attached to the draft-axle K' by two draft-rods, one, N, a straight rod parallel with the draft-lines, hooked at its rear end into an eye in the end of the bolt attaching the inner tooth to the gang-bar A and at its forward end having an eye by means of which it is attached by a suitable bolt to the eye O at the end of the draft-axle. The other draft-rod N' is similarly attached to O by the same bolt and extends rearwardly and outwardly, its hooked end engaging an eye in the end of the bolt that attaches to the gang-bar A the central spur or clod-crusher D, and in line with which is the hinge connection with the bar E. Other convergent draft-rods P P, connected at their rear ends with eyes $p$ $p$ on the draft-axle, are connected at their forward ends by a bolt $p'$, which also passes through an eye in a rod $P^2$, which after being bent to form a loop $p^2$ extends rearwardly and is attached to the seat-standard. The loop $p^2$ is for the adjustment of the whiffletree-hook or other draft devices of the team. I also prefer to connect the draft-axle between the wheels K K by means of rods or links Q with the seat-standard, to which they are connected by the bolt $l'$. An adjusting-lever R, rigidly attached by a suitable bolt or otherwise to the rocking bar E, extends forward within convenient reach of the rider. By the manipulation of this lever, which is held in any desired position by engagement with notches in the seat-standard, the bar E is rocked and the angular inclination of the teeth to the soil thereby varied. By drawing the lever upwardly the teeth are thrown down into operative engagement with the soil, and by moving the lever forward they may be thrown out of contact with the soil, when the machine may rest upon the spurs D and the flat front portions of the teeth.

Referring now to Figs. 1 and 9, the rows of circles X Y indicate two rows of trees in an orchard. The intervening space is divided by dotted lines into four quarters, (marked 1, 2, 3, and 4.) In one traverse of this space the separated gangs of teeth will harrow the first and third quarters of the space and in the next traverse the second and fourth quarters, and in each traverse the horses travel in the area occupied by the two middle quarters 2 and 3, injury to the trees by the team being thereby avoided.

To give the machine the capacity of adjustment to adapt it to different spaces between rows of trees, the bar E is provided with the aperture $e'$, so that the plates F G of the hinge connection may be connected at that point. This is indicated in Fig. 2, which also shows the draft-links N N' connected farther in on the draft-axle with an eye thereon (marked O'.) When the inner ends of the two gangs of teeth are brought close together, as in Fig. 3, so that the machine may be used to harrow a continuous width, or when it is to be transported, the plates F G of the hinge connection are connected at the aperture $e^2$. When the machine is so organized, the draft-links N N' are reversed in position; but otherwise there is no change, the bolts that secure the outer teeth to the gang-bars A having eyes in their forward ends to receive the draft-links. However, the two gangs of cutters may be set nearer to or farther from the central draft-line. It is apparent that they can rock transversely to that line to conform to the surface traversed. This rocking movement is indicated by the dotted lines in Fig. 4. The wheels K K are provided to insure the travel of the machine in a straight line, and they are also of assistance in turning when the operator raises or partly raises the machine by means of the handles.

The entire structure, as indicated, is composed of metal—iron or steel. The several bars A B E are tubular, while the seat-standard may be of angle-iron.

The strain of the draft while applied primarily to the gang-bars A A may also be partly received by the bar E through the seat-standard, links Q Q, and legs l.

What is claimed as new, and desired to be secured by Letters Patent, is—

1. In a harrow, the combination of an elongated rocking bar disposed on opposite sides of the central draft-line, two gangs of teeth respectively connected with said bar on opposite sides of the draft-line, means for rocking the bar to vary the angular relation of the teeth to the soil, and detachable adjustable connections between the bar and the two gangs of teeth whereby the inner ends of gangs may be set close together or may be separated by a space equal, or substantially equal, to the length of each gang.

2. In a harrow the combination of an elongated rocking bar disposed equally on opposite sides of the central draft-line, two gangs of teeth respectively connected with said bar on opposite sides of the draft-line with a space between them equal, or substantially equal, to the length of each gang, and means for rocking the bar to vary the angular relation of the teeth to the soil.

3. In a harrow the combination of an elongated rocking bar disposed equally on opposite sides of the central draft-line, two gangs of teeth respectively connected with said bar on opposite sides of the draft-line with a space between them equal, or substantially equal, to the length of each gang, means for rocking the bar to vary the angular relation of the teeth to the soil, draft devices, a seat-standard connected with the draft devices at its lower forward end and pivotally supported upon the rocking bar at its rear upper end.

4. In a harrow the combination of an elongated rocking bar disposed equally on opposite sides of the central draft-line, two gangs of teeth respectively connected with said bar on opposite sides of the draft-line with a space between them equal, or substantially equal, to the length of each gang, means for rocking the bar to vary the angular relation of the teeth to the soil, draft devices, a seat-standard connected with the draft devices at its lower forward end and pivotally supported upon the rocking bar at its rear upper end, and rods or draft connections connecting the two gangs of teeth with the draft devices.

5. In a harrow the combination of the bar E disposed equally on opposite sides of the central draft-line, two gangs of teeth respectively connected with said bar on opposite sides of the draft-line by hinge connections upon which the gangs may rock transversely to the line of draft, the wheels K K, the draft-axle upon which they are mounted, the draft-rods as P P connected with the axle and the draft-rods as N N' connecting the axle and the gangs of teeth.

6. In a harrow the combination of the bar E disposed equally on opposite sides of the central draft-line, two gangs of teeth respectively connected with said bar on opposite sides of the draft-line by hinge connections upon which the gangs may rock transversely to the line of draft, the wheels K K, the draft-axle upon which they are mounted, the draft-rods as P P connected with the axle, the draft-rods as N N' connecting the axle and the gangs of teeth, a seat-standard connected at its lower front end with the axle K' and pivotally supported at its upper rear end upon the bar E.

7. In a harrow the combination of the bar E disposed equally on opposite sides of the central draft-line, two gangs of teeth respectively connected with said bar on opposite sides of the draft-line by hinge connections upon which the gangs may rock transversely to the line of draft, the wheels K K, the draft-axle upon which they are mounted, the draft-rods as P P connected with the axle, the draft-rods as N N' connecting the axle and the gangs of teeth, a seat-standard connected at its lower front end with the axle K' and pivotally supported at its upper rear end upon the bar E, and a lever connected with the bar E by means of which it may be rocked to change the angular relation of the teeth to the soil.

8. In a harrow the combination of the gang-bars A B, the rearwardly-extending harrow-teeth, the bar E, hinge connections between the bar E and the respective gang-bars A B, and means for shifting the hinge connection upon the bar E to vary the distance apart of the inner ends of the two gangs of teeth.

9. In a harrow the combination of the gang-bars A B, the rearwardly-extending harrow-teeth, the bar E, hinge connections between the bar E and the respective gang-bars A B, means for shifting the hinge connection upon the bar E to vary the distance apart of the inner ends of the two gangs of teeth, the wheels and axle arranged forward of the gangs, the draft-rods connecting the gangs with the axle, the two draft-rods for each gang being connected at a common point to the axle and to the center and inner end respectively of the gang of teeth.

In testimony whereof I have hereunto subscribed my name.

CORNELIA R. B. NISHWITZ,
*Administratrix of the estate of Frederick Nishwitz, deceased.*

Witnesses:
DORETHA C. NISHWITZ,
FRED P. BAKER.